UNITED STATES PATENT OFFICE.

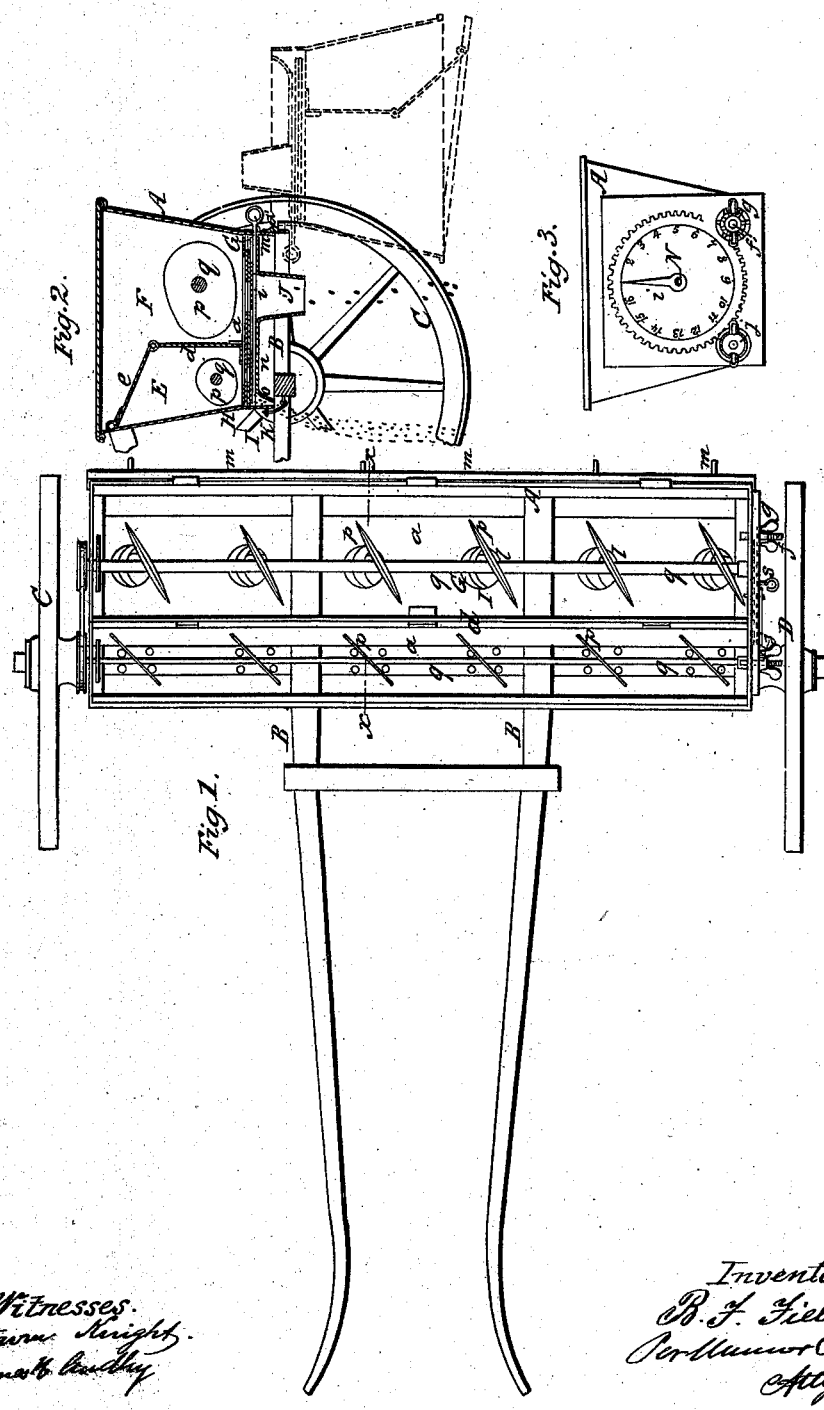

B. F. FIELD, OF SHEBOYGAN FALLS, WISCONSIN.

IMPROVEMENT IN SEEDING-MACHINES.

Specification forming part of Letters Patent No. 35,438, dated June 3, 1862.

*To all whom it may concern:*

Be it known that I, B. F. FIELD, of Sheboygan Falls, in the county of Sheboygan and State of Wisconsin, have invented a new and useful Improvement in Seeding-Machines; and I do hereby declare the following to be a full, clear, and exact description thereof, reference being had to the accompanying drawings, making a part of this specification, in which—

Figure 1 is a plan of my improved machine. Fig. 2 is a vertical longitudinal section taken at the line $x\,x$. Fig. 3 is an end view of the seed-hopper.

Similar letters of reference indicate corresponding parts in the several figures.

It consists, first, in the means employed for regulating the size of the seed-openings to adapt the machine to sow any given quantity of seed to the acre.

It consists, secondly, in a combination of parts hereinafter to be described.

It consists, thirdly, in the peculiar construction and arrangement of agitator hereinafter to be described.

To enable those skilled in the art to fully understand and construct my invention, I will proceed to describe it.

A represents a hopper of usual construction formed with downwardly-converging sides and mounted on the hind end of a frame, B, supported on two wheels, C D. Said hopper is attached at its back and lower edge to the frame B by metal hinges $a'$, of which there may be two or more, as may be desired, for the purpose hereinafter to be explained. The front bottom edge of the hopper is furnished with a staple or projection, over which a hook attached to the frame B catches when the machine is in condition to secure the hopper in its proper position. The hopper is provided with a true and false bottom located one above the other and both a little above its lower edge and supported with interposed seed-slides in rabbets extending on each side the entire length of the hopper. The hopper on the inside is divided by a partition, $d$, which extends the entire length thereof and about two-thirds of the height of the same from the bottom upward, forming two compartments, E F, of unequal capacity. The one in front and smallest, E, being for grass-seed, and the other, F, for grain. The grass-seed compartment E is closed by an inclined cover, $e$, attached by hinges to the top edge of the partition $d$, and resting at its opposite edge against the inner front side of the hopper. The false bottom $a$ in each of the compartments of the hopper is furnished with openings to allow the grain and grass-seed to pass through them.

The slide G under the grain-seed compartment is made somewhat shorter than the hopper, and is furnished with openings corresponding in size with those in the bottom of the compartment F, and is attached at one end to a screw, $f$, which is fitted to work through a nut, $g$, fitted in one end of the seed-hopper, said nut being furnished on its periphery with cog-teeth, and on its outer end with thumb-pieces, whereby it is rotated, and the seed-measuring slide G moved in a direction to cover more or less (as may be desired) of the seed-openings in the false bottom $a$ of the grain-compartment F to adapt the machine to sow any given quantity of grain to the acre. The cogs on the periphery of the thumb-nut $g$ mesh into similar cogs of the wheel $h$ (shown in dotted lines in Figs. 1 and 3) on the outer end of whose axis an index, $i$, is fixed, which, pointing to the figures on the dial, indicates the number of bushels per acre the machine is set to sow.

The measuring-slide H under the grain-seed compartment E is perforated to correspond with the openings in its false bottom, and is attached to a screw and operated by a thumb-nut, $j$, in precisely the same manner as the one before mentioned, with the exception that it has no connection with an index.

Covering the under side of the grain and grass-seed measuring slides is a shut-off slide, I, which is supported by cross-pieces K, attached at their opposite ends to the rabbets by screws; or they may be attached in any other suitable manner. The shut-off slide, in a central line immediately under the seed-grain openings, is furnished with openings of corresponding size, and under the grass-seed openings it is notched, so that when moved in one direction by means of the rod $s$ the openings are made to correspond with those in both compartments E F of the hopper, and when moved in the opposite direction the imperforate portion of the slide is brought under the seed-openings in the false bottom, and they thereby closed. The object of this latter slide I is to enable the operator to stop the flow of seed from the compartments E F while the machine is being transported to or from the field without having to change or move the measuring-slides and thus having to adjust the same every time the machine is used.

To enable the farmer to shut off the flow of the seed through any one or more of the seed-openings without effecting the other, short slides *l* are fitted transversely of the hopper in rabbets formed in the inner sides of the cross-pieces *k*. These slides have each an opening in them of the same size as the openings in the measuring-slide G, and are moved to one side or the other to cover or uncover the openings in the measuring-slide, as may be desired, by a rod, *m*, attached to one end and protruding through the back side of the hopper.

The true bottom *n* of the hopper at its front edge forms a chute, *o*, to give a forward direction to the grass-seed as it issues from the hopper, and thus prevent it from getting mixed with the grain.

J J are seed-tubes, located immediately under the openings in the false bottom *a* and depending from the bottom *n*, for the purpose of conducting the grain into the drills, which may be formed in any of the usual ways.

Each of the compartments E F is furnished with a stirrer, which is composed of a disk of metal, *p*, in elliptical form, secured in an oblique position in a shaft, *q*, supported at its end respectively in the ends of the hopper.

The shaft on which the disks are placed are arranged so as to revolve in close proximity to the false bottom *a* of the hopper, and by its rotation to move the grain in the direction of the length of the hopper over the openings therein.

The stirrers are revolved by means of bands passing over the hub of the driving-wheels and pulleys on the ends of the shafts, or they may be driven by means of cog-gearing if preferred.

The grain and grass-seed, being placed in their respective compartments in the hopper, are prevented from passing through the seed-openings while the machine is being transported to or from the field by the shut-off slide I being moved so as to cover the openings in the measuring-slide.

By turning the thumb-screw nut *g* the grain-measuring slide G may be adjusted so as to adapt the machine to sow any given quantity of seed to the acre, the index *i* pointing out the amount on the dial N. When properly adjusted the shut-off slide I is removed to the opposite end of the hopper, and the machine is then ready for use.

When it is desired to clean the compartments in the hopper of seed after the machine has been used it is effected by simply unfastening the hopper at the front side and turning it over, as shown in red lines in Fig. 2, allowing the grain to run out first before the unfastening the cover of the grass-seed compartment.

I am aware that a measuring-slide in the hopper of a seeding-machine has been arranged so as to be moved by a screw at one end of the hopper and the said movement of the slide made to operate an index pivoted on the side of the hopper, as in the rejected application of Kuhn & Haines, January 13, 1855, and others. I therefore make no claim to such.

I am also aware that agitators have been made consisting of a series of spiral flanges arranged on the periphery of a drum; also of one or more serpentine flanges on a drum, and therefore make no claim to such devices; but,

Having thus described my invention, what I claim as new, and desire to secure by Letters Patent, is—

1. The combination of the grain-measuring slide G, screw *f*, thumb-nut *g*, index *i*, and dial N with the bottom *a* and shut-off slide I, when arranged in the manner and for the purpose set forth.

2. The combination of the compartments E F, false bottom *a*, slides G I, tubes J J, and chute *o*, when arranged as described.

3. The agitators consisting of elliptically-formed disks of metal *p*, secured in an oblique position on a horizontal shaft, *q*, arranged to operate in the manner and for the purpose set forth.

B. F. FIELD.

Witnesses:
  JAMES U. GRIDLEY,
  EDM. F. BROWN.